June 19, 1934.  A. O. BUCKIUS  1,963,777

ROLLER BEARING JOURNAL BOX

Filed March 19, 1930  2 Sheets-Sheet 1

Inventor:
Albert O. Buckius
By his Attorney
Clarence Kerr

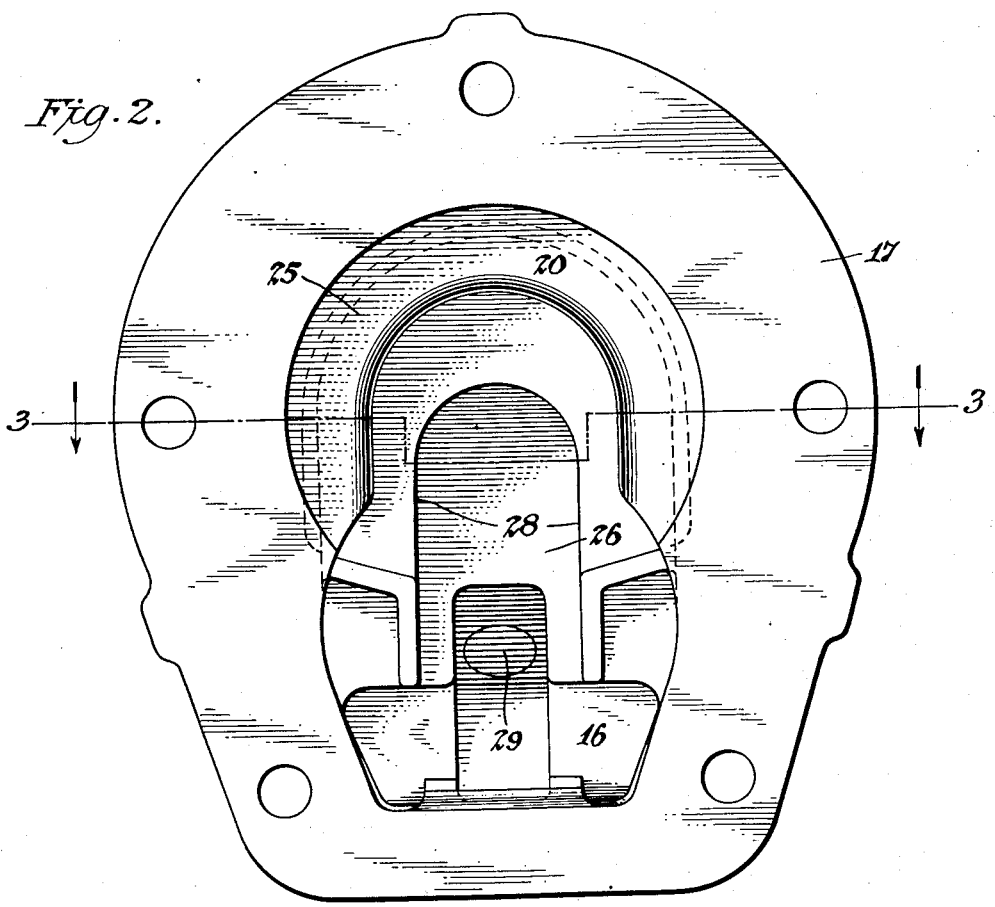
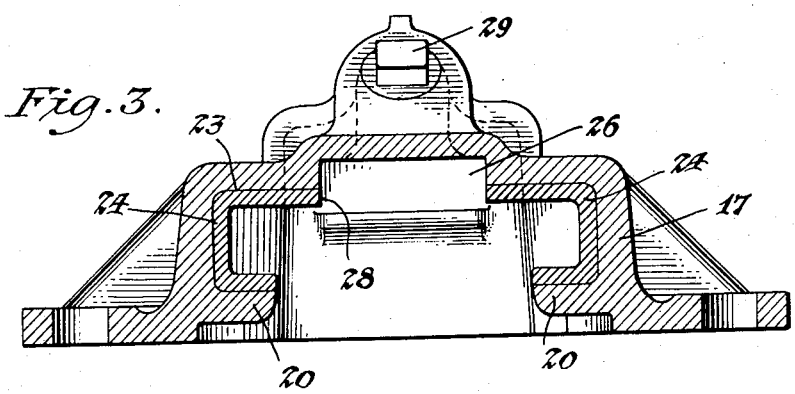

Patented June 19, 1934

1,963,777

UNITED STATES PATENT OFFICE 1,963,777

ROLLER BEARING JOURNAL BOX

Albert O. Buckius, Cleveland, Ohio, assignor to National Malleable & Steel Castings Company, Cleveland, Ohio, a corporation of Ohio Application March 19, 1930, Serial No. 436,984

12 Claims. (Cl. 308—41)

This invention relates to improvements in the construction of journal boxes for use in connection with railway cars and the like, and particularly those embodying roller bearings. The primary object of the invention has been to simplify the construction of boxes of this sort and to reduce the cost of producing the same without in any way interfering with the proper and efficient functioning of the boxes.

Heretofore it has been the common practice to employ separable bearing blocks in conjunction with journal boxes to assume the end thrusts of the latter relative to the axle. In devices of this sort, as ordinarily applied to railway cars, it is advantageous that they be capable of assuming the ends thrusts in both directions. Frequently separate elements are provided for receiving the thrusts in the two directions.

A principal feature of the present invention is the provision of a thrust member capable of receiving thrusts in both directions and formed integral with the end closure for the box. One difficulty encountered in the development of such a construction, and which has been overcome by the present improvements, is the provision, in such an integral structure, of a bearing member which is formed of material suitable for the reception of the frictional wearing forces imposed upon the bearing. It has been found either necessary or desirable in the past to form such bearing members of phosphor bronze, or similar good bearing material. To form the closure member for the journal box completely of any such good bearing material would be impracticable. A construction of this type would not only be out of the question from the standpoint of expense, but it would not be capable of withstanding the shocks and strains to which it would, in normal use, be subjected. In order that there may be obtained the combined advantages of cheapness of construction and, at the same time, durability and required strength, applicant's invention contemplates the employment of a cover formed primarily of grey iron or semi-steel, or similar material of strength having the surfaces which receive the end thrusts of the box relative to the journal merely lined with some suitable form of bearing metal, such as babbitt, bronze, or the like. Such a construction is not only both cheaper and stronger than the constructions heretofore employed, involving the use of separate bearing blocks, but at the same time it has the further advantage of greater simplicity. Other objects and advantages of the invention will appear from the description of one admirable embodiment thereof which will now be given in detail in conjunction with the accompanying drawings, in which:

Figure 2 is an elevational view of the cover of the journal box taken from the inner side of the latter, and Figure 3 is a sectional view through the cover taken along the line 3—3 of Figure 2.

Figure 1:
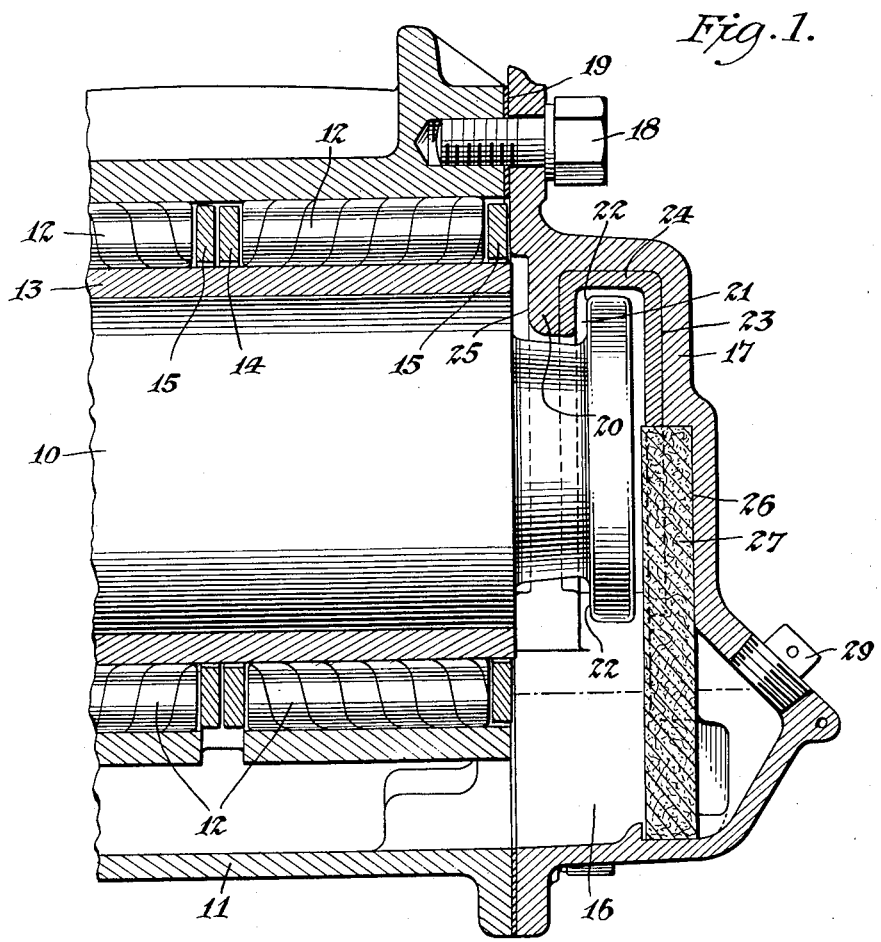
Figure 1 is a vertical sectional view of the forward portion of a journal box embodying the novel thrust-bearing construction.

Referring now to the drawings, the journal or axle 10 of a railway car is shown extending into the main central opening in a journal box 11. Preferably the co-operation between the axle and the box will be effected through a roller bearing construction embodying a plurality of series of rollers 12 adapted to contact the inner surface of the box and cooperate either directly with the periphery of the journal or with the surface of a bushing 13 fitted over the end of the journal. Suitable cages or retaining rings 14 and 15 may be provided at the opposite ends of the rollers to hold them in place. At the bottom of the journal box there is preferably provided an oil reservoir 16 adapted to receive a quantity of lubricant which may be carried to any suitable level, but preferably to a plane passing substantially through the centers of the rollers 12 as they pass the lowermost point in their travel.

A cover or closure member 17 is provided for the outer end of the journal box and may be attached to the latter in any suitable way, as by means of a series of bolts 18 passing through openings in a flange of the cover and having screw-threaded engagement with recesses formed in the end of the journal box. In order to provide a liquid-tight seal between the cover and the main body of the box, a gasket 19 will preferably be employed between the co-operating faces of these elements.

At a point near the open end of the cover there is provided an inwardly extending flange or member 20 of substantially a horseshoe formation and adapted to fit into a groove 21 formed near the end of the journal 10. The surface of the flange 20, which faces outwardly or toward the main portion of the cover, is adapted to come into engagement with the top and sides of an annular shoulder 22 formed by the groove in the journal during an outward end-thrust of the journal box. Similarly, the inner surface 23 of the cover, which is directly opposite the end of the journal, is adapted at times to come into engagement with the journal end during a thrust of the journal box in the opposite direction. It is desirable, therefore, that these two surfaces should present to the co-operating portions of the axle a suitable bearing material and for this purpose they are preferably lined with babbitt or phosphor bronze, or similar metal or other substance, as best shown in Figures 1 and 3. A very simple method of providing the desired construction is to cast into the cover a unitary lining 24 of babbitt of suitable thickness in the form indicated in the drawings to cover the surface of the flange 20 and the inner surface 23 of the closure member. As shown in Figure 1, a clearance is preferably provided between the bearing surfaces of the cover and the cooperating surfaces of the journal so that the faces which are brought together by a relative movement between these parts during an end-thrust may be normally maintained out of contact. The groove 21 near the end of the axle should be of sufficiently greater width than the combined thickness of the flange 20 and its lining material that a thrust of the box toward the left in Figure 1 will bring the lining of the surface 23 against the end of the journal before the rear surface 25 of the flange is brought into engagement with the opposed shoulder of the journal.

The babbitt lining applied to the surface 23 should preferably extend over substantially the entire surface opposite the end of the axle. However, for the purpose of providing adequate lubrication for the bearing surfaces at the end of the journal, a recess 26 should be formed in the cover to receive a wick 27 adapted to convey oil from the reservoir at the bottom of the journal box to a section of the lower portion of the end of the journal, preferably up to or somewhat above the center of the latter. To accommodate this wick the babbitt, or similar lining, applied to the surface 23 should be cut away, as indicated at the point 28 of Figure 2. At the bottom of the cover a lug or projection is preferably provided for the purpose of retaining the lower end of the wick in place. It will be noted that the construction is such that the wick will be removed with the cover. In the course of inspection of the journal it is only necessary to remove a single member, i. e. the cover, rather than a plurality of separate elements as in prior constructions. A removable screw plug 29 may be provided in the lower portion of the journal box to permit inspection and replenishment of the supply of lubricating oil.

It will be clear from the foregoing description that when the journal box is moved to the right, in Figure 1, due to the transmission of an end-thrust in this direction, the lined surface of the flange 20 will be brought against the opposed shoulder formed by the groove in the journal to resist further endwise movement. Shifting of the journal box in the opposite direction, due to an opposite end-thrust, will carry the lining over the surface 23 against the end of the journal to resist further movement in that direction. At the same time the surface on the cover which is opposite the roller retaining ring 15 will be brought into engagement with this ring and will be subjected to a certain amount of wear. Since this surface, in the preferred construction, is not provided with a babbitt or similar lining, it should be formed of suitable wear-resisting material, such as grey iron or semi-steel, or the like. The construction illustrated, therefore, provides for good wear resistance at certain points and adequate strength of the thrust-receiving members by virtue of the material of the main body of the cover which is suitably selected for these purposes while at the same time the desired good bearing qualities are effectively brought about with little expense by the provision of the linings over the surfaces indicated.

An important phase of the present construction is the ease with which the thrust-receiving surfaces may be replaced when they have become so worn as to be unsuitable for further use. All that is required is to melt out the remaining babbitt or similar material and cast into the cover a new lining of the same type. This may be done at a low cost and the cover as a whole may be used over and over again almost indefinitely.

Another important feature of the construction which should be noted is the relative locations of the journal, the main body of the box and the removable cover. The arrangement of these parts is such that the groove 21 in the journal lies wholly outside of the main box structure in the normal condition of the parts so that the cover may be readily removed, after the bolts 18 have been withdrawn, by merely lifting the cover to disengage the extension 20 from the groove.

While one admirable form of the invention has been described in detail, it should be understood that various modifications may be made without departing from the general spirit and scope of the invention. Although it is regarded as particularly advantageous to provide the cover member with integral, lined surfaces adapted to receive the thrusts in both directions, it will be apparent that the structure may readily be so modified that thrusts in only one direction will be taken by the provision of only a single, integral, lined surface. The terms employed in the foregoing disclosure are to be regarded merely as descriptive of the invention and not as imposing any limitations thereon.

What I claim is:

1. In a device of the class described a journal box, a journal co-operating therewith, said journal having a groove in the periphery thereof, a removable cover for said box and an extension integral with said cover adapted to co-operate with said groove, said cover and integral extension being adapted to receive the end thrusts of said box relative to said journal in both directions, removal of said cover requiring a substantially vertical movement thereof.

2. In a device of the class described a journal box, a journal co-operating therewith, said journal having a groove in the periphery thereof, a removable cover for said box, an extension integral with said cover adapted to co-operate with said groove, said cover and integral extension being adapted to receive the end thrusts of said box relative to said journal in both directions, and a lining of good bearing material applied to the surfaces of said cover and extension which receive the thrusts, removal of said cover requiring a substantially vertical movement thereof.

3. In a device of the class described a journal box, a car journal co-operating therewith, said journal having a groove around its periphery, a cover detachably secured to said box, and an extension integral with said cover co-operating with said groove to receive end thrusts in one direction, said cover being shiftable vertically in detaching it from said box.

4. In a device of the class described a journal box, a cover detachably secured to the outer end of said box, a journal co-operating with said box, said journal having a groove around its periphery in a plane outside of the body of the box, and an extension integral with said cover fitting into said groove and co-operating with the wall of the latter to receive end thrusts in one direction.

5. In a device of the class described a journal box, a cover detachably secured to the outer end of said box, a journal co-operating with said box, said journal having a groove around its periphery in a plane outside of the body of the box, and an extension integral with said cover fitting into said groove and co-operating with the wall of the latter to receive end thrusts in one direction, said extension being lined on the thrust receiving surface with a good bearing material.

6. In a device of the class described a journal box, a journal co-operating therewith, said journal having a groove around its periphery providing a collar adjacent its end, and a cover secured to the end of said box inwardly of said collar, said cover having integral portions co-operating with the end of said journal and with a wall of said groove to receive the relative thrusts between said box and journal in both directions.

7. In a device of the class described a journal box, a journal co-operating therewith, said journal having a groove around its periphery, and a cover having a flange thereof secured to the end of said box, said cover having integral portions disposed outwardly of said flange co-operating with the end of said journal and with a wall of said groove to receive the relative thrusts between said box and journal in both directions, the surface of said cover co-operating with the end of said journal having an area substantially equal to that of the journal end.

8. In a device of the class described a journal box, a journal co-operating therewith, said journal having a groove around its periphery, a cover having a flange thereof secured to the end of said box, said cover having integral portions disposed outwardly of said flange co-operating with the end of said journal and with a wall of said groove to receive the relative thrusts between said box and journal in both directions, and a lining formed of good bearing material carried by said cover over the thrust receiving surfaces.

9. In a journal box, a journal co-operating therewith, a groove around the end of the journal, a cover for the box having a portion normally positioned in said groove, said cover being adapted to be removed from said journal box in a direction substantially at right angles to the horizontal center line of the journal.

10. In a device of the class described, a journal box, a journal cooperating therewith, a unitary cover having a flange engaging the journal box for attaching the cover thereto and having an outer portion adapted to receive thrusts from said journal in one direction, a groove in said journal, and a projection on the cover between vertical planes passing through said flange and said portion, extending into said groove for receiving thrusts in another direction.

11. In a device of the class described, a journal box, a journal cooperating therewith, a unitary cover having a flange engaging the journal box for attaching the cover thereto and having an outer portion adapted to receive thrusts from said journal in one direction, a groove in said journal, and a projection on the cover between vertical planes passing through said flange and said portion, extending into said groove for receiving thrusts in another direction, said thrust receiving portion and said projection being lined with a good bearing material.

12. In a device of the class described a journal box, a journal cooperating therewith, a unitary cover having a flange at its inner end engaging the journal box for attaching the cover thereto, and thrust receiving surfaces formed on said cover between said flange and the outer surface of the cover in an axial direction for receiving thrusts in both directions relative to said journal.

ALBERT O. BUCKIUS.